United States Patent
Wurth et al.

(10) Patent No.: US 6,361,281 B1
(45) Date of Patent: Mar. 26, 2002

(54) ELECTRICALLY DRIVEN COMPRESSOR WITH CONTACTLESS CONTROL

(75) Inventors: Lukas M. Wurth, Ebly (BE); Michael Eugene Daniels, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/643,797

(22) Filed: Aug. 22, 2000

(51) Int. Cl.[7] ............................. F04B 49/00; F04B 53/00
(52) U.S. Cl. ............................................ 417/63; 417/572
(58) Field of Search ................................. 417/63, 410.1, 417/572

(56) References Cited

U.S. PATENT DOCUMENTS

| | | | | |
|---|---|---|---|---|
| 3,743,140 A | * | 7/1973 | Sauerbrey | 222/63 |
| 5,484,266 A | * | 1/1996 | Murga | 417/44.1 |
| 6,247,352 B1 | * | 6/2001 | Green et al. | 73/40 |

* cited by examiner

*Primary Examiner*—Charles G. Freay
(74) *Attorney, Agent, or Firm*—Patrick M. Griffin

(57) ABSTRACT

A sealed, electrically controlled compressor provides for two way optical data transmission to and from its sealed interior. An optical window, securely sealed through the compressor shell, and a pair of optical devices located to either side of the window, allow data transfer with no separate lines piercing the shell.

3 Claims, 3 Drawing Sheets

ELECTRICALLY DRIVEN COMPRESSOR WITH CONTACTLESS CONTROL

TECHNICAL FIELD

This invention relates to automotive air conditioning systems in general, and specifically to an electrically controlled compressor that has control communication through the compressor housing without a direct wire connection.

BACKGROUND OF THE INVENTION

A recent trend toward electrically driven, rather than engine belt driven compressors, promises to provide better and more efficient control, as well as eliminating clutches and seals around the drive shafts. Since a mechanical drive shaft with its rubbing seal no longer pierces the compressor housing, such compressors are sometimes referred to as being hermetically, completely sealed. This is somewhat of a misnomer, since a power carrying wire, instead of a shaft, must pierce the compressor shell to carry current to the motor. While not a moving part, the power wire must still be sealed at its interface with the housing. It is desirable to drive such compressors with a brushless electric motor, often referred to as a brushless DC motor, though it is actually an AC type motor. Since an automotive vehicle has only a DC primary electric source, an inverter is necessary to effectively convert the DC current to AC current, to act, in essence, as the equivalent of a conventional mechanical brush and commutator assembly to switch the current. There are also potential advantages to physically incorporating the inverter and its associated electronics inside the compressor shell, providing a compact package, short interconnections, and even the ability to cool the power electronics with the inlet refrigerant. Other sensors may be incorporated within the compressor shell, also. In that case, another wire or even wire bundle would, conventionally, have to pierce the compressor shell to provide two way communication between the vehicle controller and the compressor control electronics. This would require yet another pressure tight seal at the interface.

SUMMARY OF THE INVENTION

The invention provides a compressor having a shell that incorporates control electronics internally, but which does not require that a deparate data carrying line physically pierce the compressor shell, with its associated seal. Instead, an assembly consisting of a first optical transmission device inside the compressor housing acts across a suitably transparent, small window through the compressor shell, transmitting and or receiving data to or from a corresponding second optical device outside the compressor shell. The optical window is a solid piece which can effectively be made integral to the compressor shell itself, and is thus very tightly sealed.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
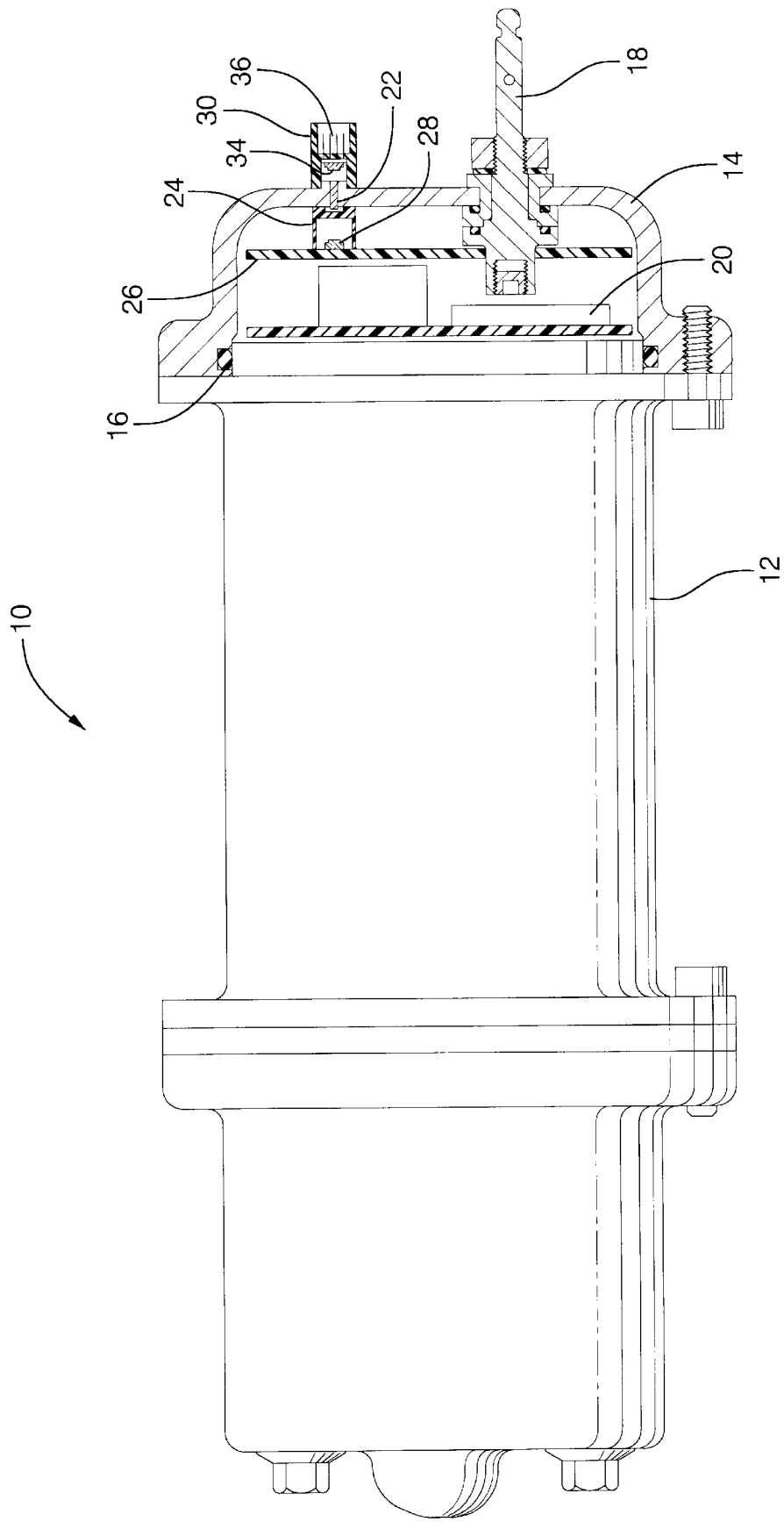
FIG. 1 is a partially broken away side view of a compressor housing incorporating an embodiment of the invention.

Referring first to FIG. 1, an electrically driven compressor, indicated generally at 10, has a non-illustrated internal motor and scroll compressor device contained within a cylindrical shell 12. Shell 12 is closed at the end by a removable end cap 14 sealed by an O ring type seal 16. A basic power connection 18 necessarily pierces the end cap 14 to carry current to the internal motor, and this must be suitably sealed at its interface to cap 14. As rioted above, that motor is preferably the "brushless" variety, in which an inverter commutates electronically the phases of the motor. This avoids wear and provides for more complete and precise electronic control of the motor. An inverter uses power transistors that produce a good deal of heat. Here, the inverter and its associated circuitry, indicated generally at 20, is incorporated within the end cap 14, where it can be exposed to a cooling stream of inlet refrigerant. This also provides a compact and protected package for the electronics. The inverter 20 must have the on-off time of its power transistors precisely controlled, and this necessitates an exchange of data between the vehicle's control system and the inverter 20. For example, the vehicle controller might send to the compressor 10 a coded request for a desired RPM or maximum power value. The compressor 10 could send to the vehicle a value for actual RPM, or data about its temperature, voltage, or power consumption, from internal sensors other than the inverter 20. If a wire or series of wires also had to pierce cap 14 to carry these data back and forth, it would represent several additional possible leak points that would have to be rigorously sealed. The subject invention allows a data exchange across the shell 12, effectively without piercing it.

Figure 2:
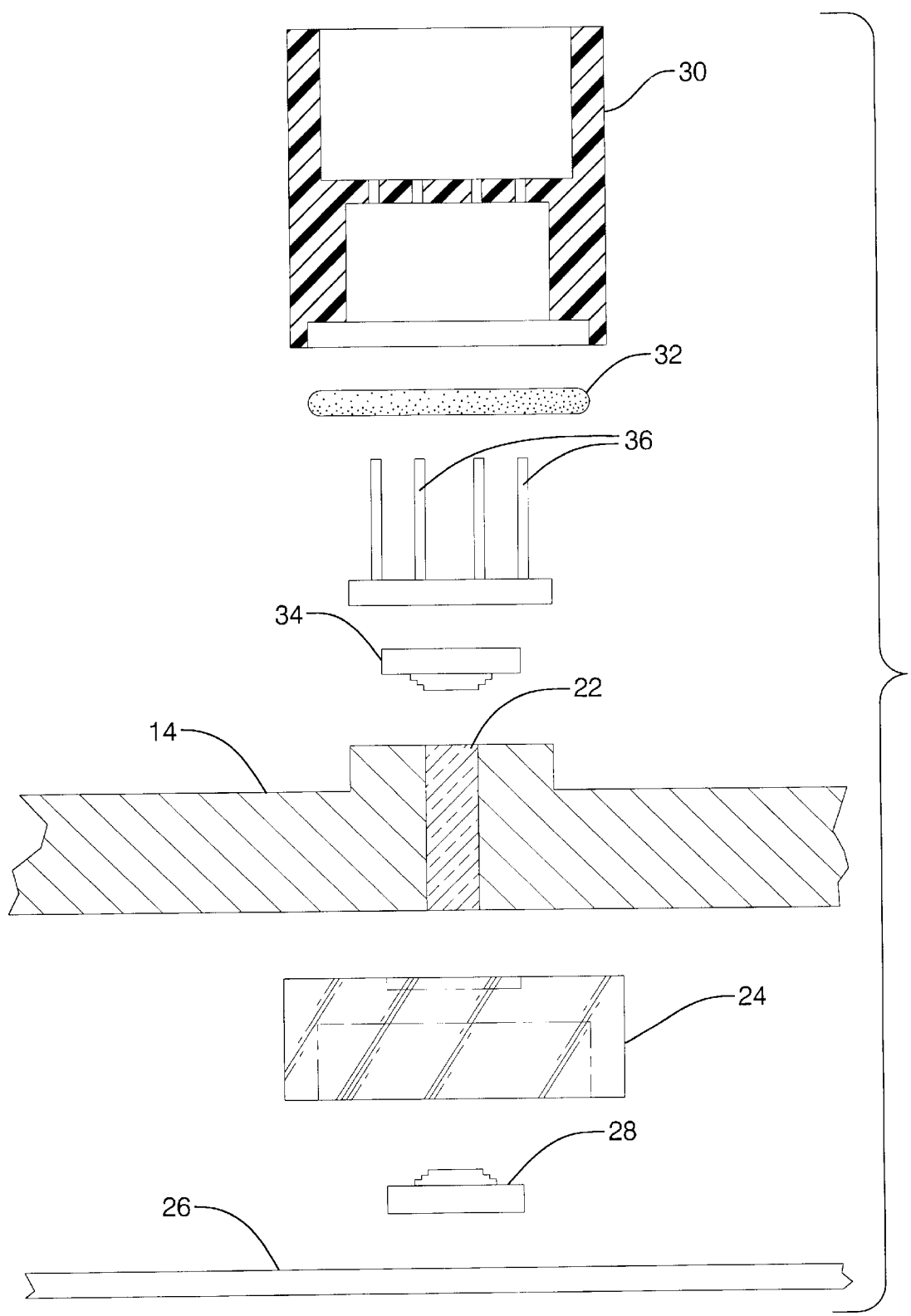
FIG. 2 is a view of one embodiment of the invention, with the components disassembled.
Figure 3:
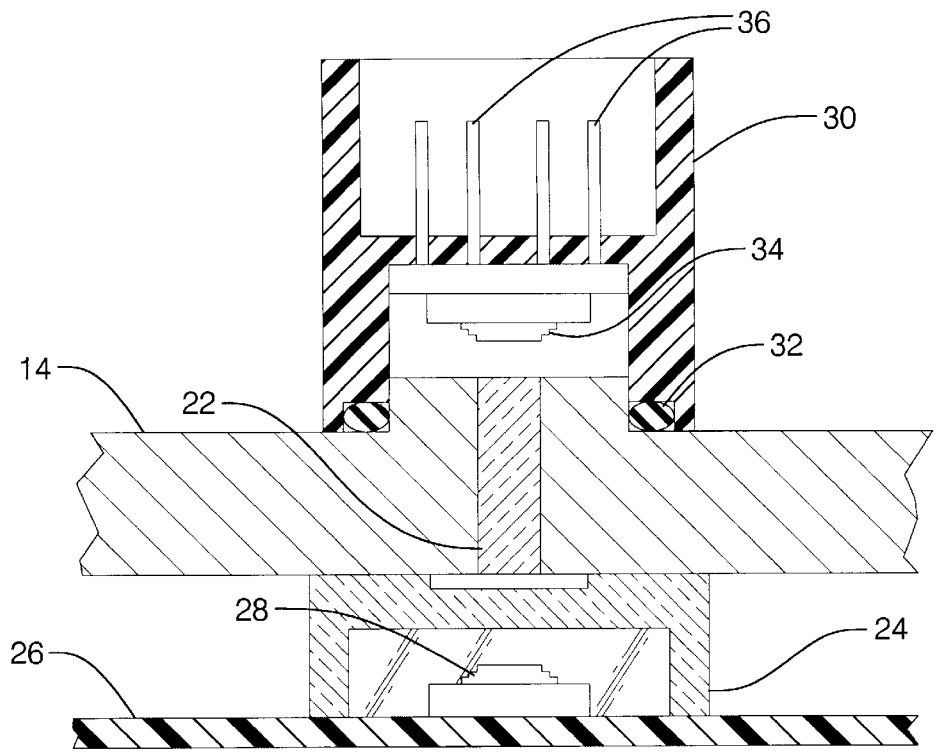
FIG. 3 is a view of the embodiment of FIG. 2 assembled.

Referring next to FIGS. 2 and 3, in one embodiment of the invention, a glass optical window 22 is fixed through the end cap 14. The term "optical" is used broadly to indicate an area amendable to having light source encoded data passed through it. Window 22 is formed by boring a cylindrical hole through cap 14, and pouring molten glass therewithin to harden. This creates a very solid optical path through cap 14, one which acts essentially an integral part of cap 14 and is substantially leak proof. Window 22, in the particular embodiment disclosed, would be formed of red or "black" glass, a material suitable to pass infrared light. A transparent (or at least translucent) protective housing 24 is closely engaged between the underside of window 22 and a circuit board 26 located just inboard of the underside of cap 14. Housing 24 is formed of a transparent, oil and temperature resistant material, such as polycarbonate, and should be optically similar to the window 22, in terms of color and propensity to pass light. Housing 24 covers a first optical device, indicated generally at 28. Device 28 could be a single paired receiver/transmitter of infrared light, called a transceiver, or could be two separate receivers and transmitters side by side. It may be assumed for purposes of discussion that first device 28 is a transceiver. The receiver portion is a photosensitive diode, while the transmitter portion is a light emitting diode (LED). Devices like 28 are widely commercially available, and the one disclosed is identical to those, but for having a Fresnel lens, which is more compact than a conventional hemispherical lens. First optical device 28 is mounted to board 26, within housing 24 and directly below window 22. Its associated circuitry would be mounted to board 26. As seen in FIG. 3, the lens of first device 28 is protected by housing 24 against oil containing refrigerant within cap 14.

Still referring to FIGS. 2 and 3, above cap 14, a connector block 30 fits tightly to the top of cap 14, sealed by an O ring 32 and surrounding the outside of window 22. Mounted inside connector block 30 is a second optical device 34, oriented directly above, and optically matched to, first optical device 28. Second device 34 would be identical to 28, and matched thereto, that is, respective transmitter and receiver portions would be opposed. Connector terminals 36 extend from the back of block 30, adapted to be connected to a wiring harness to the rest of the vehicle electrical and control system.

Figure 4:
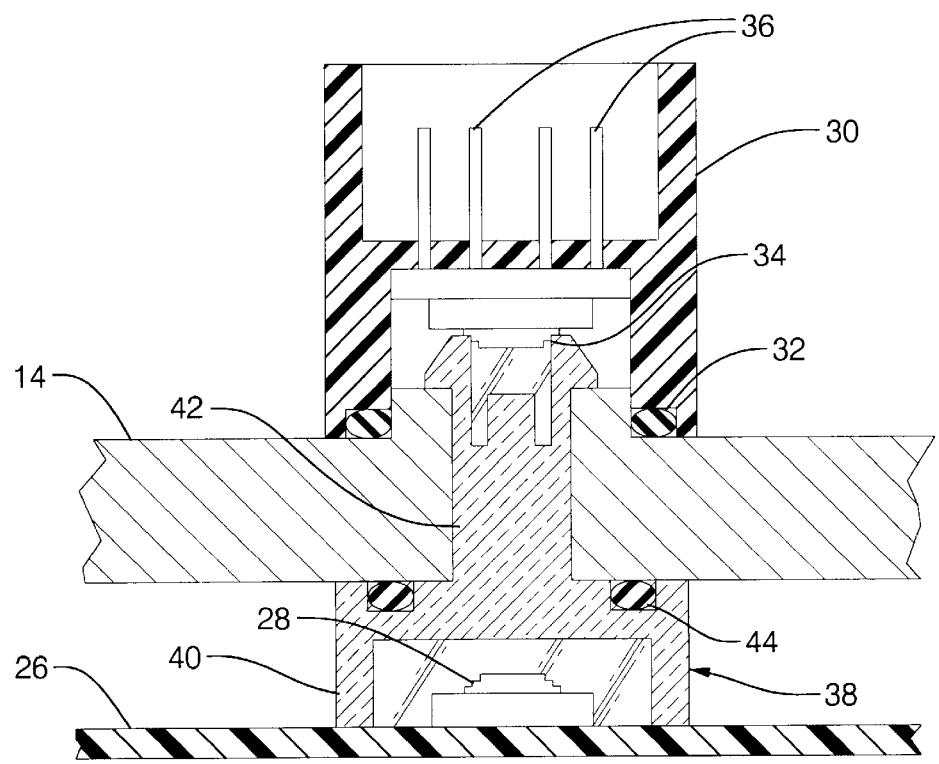
FIG. 4 is a view of an alternate embodiment.

Referring next to FIG. 4, an alternative embodiment is described. The compressor end cap 14 and most other components would remain the same, and are given the same number accordingly. Housing 24 and window 22, however, are replaced by a single part, a window-housing indicated generally at 38. Window-housing 38 provides both functions of the housing 24 and window 22 in a single part. That is, a lower housing section 40 surrounds and protects first device 28, and a upper window section 42 integral thereto passes through end cap 14, with a snap fit to provide a direct light path to the second device 34. The material used would be similar to that used for housing 24, that is, a light transmitting and oil resistant material, such as polycarbonate. The fit through the end cap 14 of window section 42 would be as close and tight as physically practicable, potentially aided by a suitable adhesive, but would not be quite as solid to end cap 14 as melted in place glass would be. Therefore, an extra O ring seal 44 is compressed between the top of housing section 40 and the underside of end cap 14 to provide additional sealing integrity.

With either embodiment, in operation, coded data would be transmitted between the two optical devices 28 and 34, such as requested and actual compressor RPM. As disclosed, infrared light is the medium, although other optical devices and light sources could be used, such as visible or even laser light. Data transmission would be simplified by the short transmission paths involved (the two devices 28 and 34 are very close), and by the lack of ambient light in the particular environment (underhood). A carrier frequency could be used for the data transmission, but it is likely that plain binary signals would work just as well. Since simultaneous transmission and sending of data would not be needed, the two devices 34 and 28 could be simply linked in an automatically responsive fashion. For example, the control scheme could be set up so that each time the vehicle control system sent a request for a certain compressor speed and power, the compressor control system, (emitter and associated sensors and circuitry) inside compressor 10 would respond automatically with a reading of actual speed and power.

Variations in the disclosed embodiment could be made. Either of the devices 34 or 28 could be just a receiver, or just an emitter, although it is most likely that two way data communication would be desired. As noted, the optical medium could be a source other than infrared light. It is possible that the internal device 28 could be in a location where it did not need environmental protection within the shell 12, although it is likely that it would, and the translucent housing 24 that provides protection without impairing data transfer is a particularly advantageous solution to that problem. Therefore, it will be understood that it is not intended to limit the invention to just the embodiment disclosed.

What is claimed is:

1. In an electrically controlled compressor having a sealed housing and associated electrical components internal to said housing, to which or from which it is desired to send or receive data, a sealed data transmission assembly, comprising, an optical window passing closely through said compressor shell in a tightly sealed fashion, a first optical device located within said compressor shell and below said window, and, a second optical device located above said window opposed to the first, whereby data can be optically exchanged across said window, with no physical data transmission lines piercing said compressor shell.

2. An assembly according to claim 1, further characterized in that said optical window is translucent to infrared light, and said first and second optical devices are each an infrared transceiver.

3. An assembly according to claim 1, further characterized in that said first optical device is sealed within said compressor shell by a housing located below said window that environmentally protects said first optical device within said shell, but which is optically transparent to said window.

* * * * *